March 7, 1972   G. A. CARLSON   3,647,653
PURIFICATION OF BRINE
Filed March 11, 1969   4 Sheets-Sheet 2

INVENTOR
GORDON A. CARLSON

BY Chisholm and Spencer
ATTORNEYS

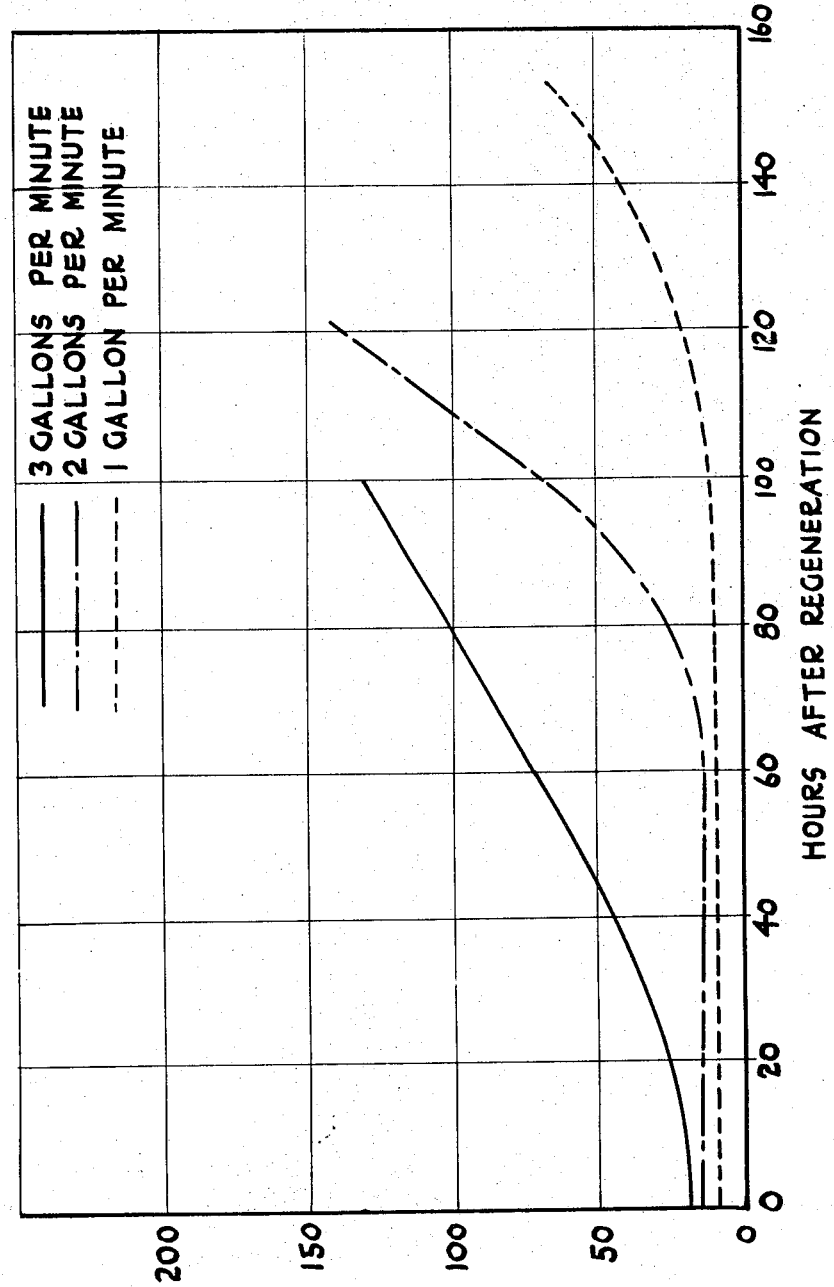

United States Patent Office 3,647,653
Patented Mar. 7, 1972

3,647,653
PURIFICATION OF BRINE
Gordon A. Carlson, New Martinsville, W. Va., assignor to PPG Industries, Inc., Pittsburgh, Pa.
Filed Mar. 11, 1969, Ser. No. 806,204
Int. Cl. B01k 1/00; C01d 1/08; C22d 1/04
U.S. Cl. 204—130
29 Claims

ABSTRACT OF THE DISCLOSURE

Disclosed is an electrolytic cell and a method for removal of mercury and other impurities from brine. The brine, having a low free chlorine content, is passed through a porous cathode and the impurities are electrolytically deposited on the cathode. The cathode is preferably regenerated by reversing the electrical potential and/or flushing with brine containing chlorine followed by flushing with hydrochloric acid solution.

---

This invention relates to electrolytic cells and, particularly, to an electrolytic cell and method for the purification of brine by the removal of impurities, such as mercury, therefrom.

One of the principal methods of producing alkali metal hydroxides from alkali metal chlorides is by electrolysis in a mercury cell. Typically, the cell comprises a long, narrow trough and a graphite anode suspended thereover. A mercury cathode flows along the trough. Brine is passed through the cell in the space between the mercury cathode and the graphite anode. During operation of the cell, the chloride ions in the brine are attracted to the anode and are discharged as chlorine gas. The cation, typically sodium, forms an amalgam with the mercury, and the amalgam is then treated in a denuder where the sodium reacts with water to produce the alkali metal hydroxide, hydrogen gas, and regenerated mercury.

It is well recognized that the aqueous brine solution while passing through the mercury cell picks up mercury, principally as the mercury ion or complex salt, probably in the form of the complex ion $HgCl_4^=$. Commonly, the brine is continuously recycled through the mercury cell with additional sodium chloride being added to maintain a satisfactory NaCl content in the brine. A small portion of the brine is removed as a purge stream during each cycle, thereby maintaining the level of impurities, such as the sulfates, at an acceptable level. The brine removed in the purge stream desirably should be utilized in some way.

In the past, the presence of mercury has prevented satisfactory use of the purge stream brine in other processes. The brine normally contains between about 3,000 and 15,000 mirco grams of mercury per liter (micro grams per liter will hereafter be designated $\mu g./l.$).

The brine from the purge stream, were it not for the presence of large amounts of mercury, could be used, for example, in the feed of a diaphragm cell. However, when brine including such amounts of mercury was used in the diaphragm cell, it was found that most of the mercury evolved as vapor together with the hydrogen produced by the diaphragm cell. The hydrogen from the diaphragm cell could be used, for example, as a raw material in the manufacture of ammonia, as a fuel gas for a combustion burner, or as a reducing agent. The hydrogen-mercury mixture is unsatisfactory for the manufacture of ammonia since the mercury destroys the catalyst used in such process. Further, the hydrogen-mercury mixture is unsatisfactory as a fuel gas since it could corrode the burner and would create undesirable fumes. In fact, the presence of mercury makes the hydrogen unsatisfactory for nearly any subsequent use. On the other hand, if the hydrogen-mercury mixture is released into the atmosphere, the mercury contained therein pollutes the air. Thus, the brine from the mercury cell purge stream has, in the past, usually been sewered, thereby wasting the salt and mercury as well as occasionally producing water or soil pollution problems.

Various methods have been proposed for removing mercury from brine. Such methods, however, have not proven completely satisfactory since, for example, they fail to process the brine rapidly enough, do not sufficiently reduce the mercury level, or else are overly complex. U.S. Pat. No. 3,083,079 shows an approach for removing mercury from brine which involves contacting the brine with a strongly basic anionic exchange quaternary ammonium resin. Although this method does remove mercury, it has the disadvantage that the ion exchange resin becomes depleted and must be either discarded, thus losing both the mercury and the ion exchange resin, or else the depleted ion exchange resin must be subjected to a complex treatment to remove the mercury. Both of the alternatives are time consuming and expensive.

U.S. Patent 3,250,692 states that mercury ions can be removed from brine by circulating the brine through a mercury cell. This method can only be satisfactorily employed on brine having a very large mercury ion content, and then only removes a portion of the mercury. Although this method does conserve mercury, the method does not provide a brine having low enough mercury levels to allow satisfactory use in other processes such as in a diaphragm cell.

The present invention provides for the purification of brine which has passed through a mercury cathode cell and relates to means by which mercury and other metallic impurities can be quickly and easily removed from brine, thereby producing a brine which may be satisfactorily utilized in other processes, for example, such brine can be electrolyzed in a diaphragm cell and the hydrogen thereby produced can be used in the manufacture of ammonia. The brine should contain less than 20 $\mu g.$ mercury per liter, but may contain as high as 50 $\mu g.$ per liter. Rarely should the brine contain in excess of 100 $\mu g.$ mercury per liter.

In the drawings:

FIG. 5 is a graph showing the effect of the present invention at various rates of brine flow through the cell of FIG. 3.

The present invention uses an electrolytic cell including a porous cathode. Impurities are electrolytically deposited on the porous cathode as brine passes therethrough. The present invention provides a method for purifying brine. The method removes substantially all of the free chlorine from the brine, such as in a dechlorination tower, and then electrolytically removes metallic impurities from the brine while maintaining a low level of free chlorine in the brine in the zone of electrolysis at which the metallic impurities are deposited. The method of the present invention may further include periodic purging of metallic impurities from the zone of electrolysis in the cathode. Although the present invention is principally directed to removal of mercury from brine, it is also applicable to the removal of other metallic impurities such as iron, copper, nickel, lead, vanadium, and manganese.

Although the method of the present invention may be used to treat brine regardless of source, in one preferred embodiment the method comprises purifying brine from a mercury cell such that the brine may be subsequently electrolyzed in a diaphragm cell and the hydrogen thereby produced can be used to maunfacture ammonia.

Figure 1:
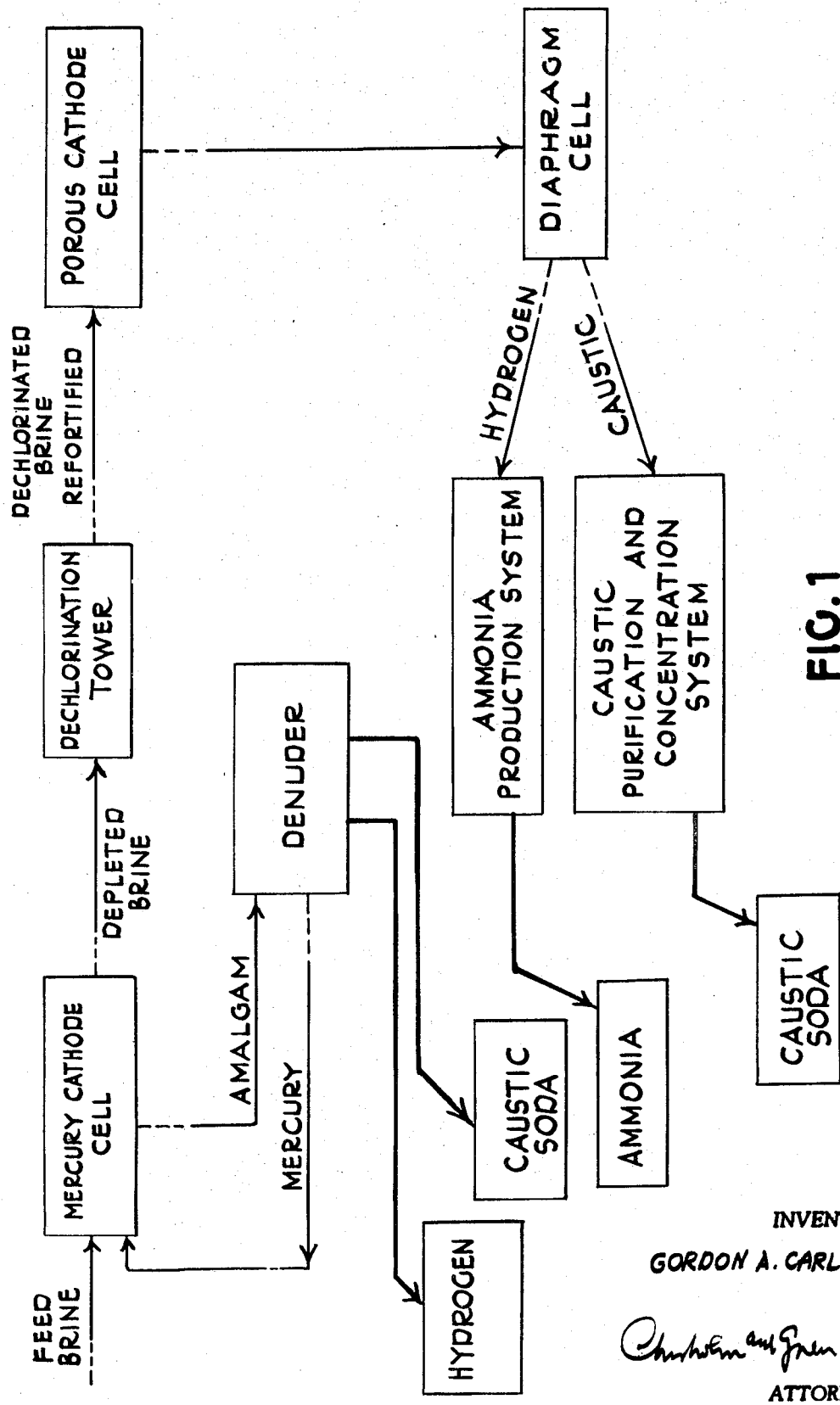
FIG. 1 is a flow diagram of a brine circuit including the present invention.

As shown in FIG. 1, brine is fed to a mercury cathode cell where the electrolytic products are amalgam and depleted brine. The amalgam is treated in a denuder to produce mercury, hydrogen gas, and caustic soda. The mercury is recycled to the mercury cathode cell. The depleted brine is treated to remove free chlorine, fortified with an alkali metal halide, and then treated in the porous cathode cell to remove metallic impurities. At least a portion of the purified brine may be electrolyzed in a diaphragm cell to produce the alkali metal hydroxide or caustic soda and hydrogen. The hydrogen is reacted with nitrogen to produce ammonia or used for other purposes.

Figure 2:
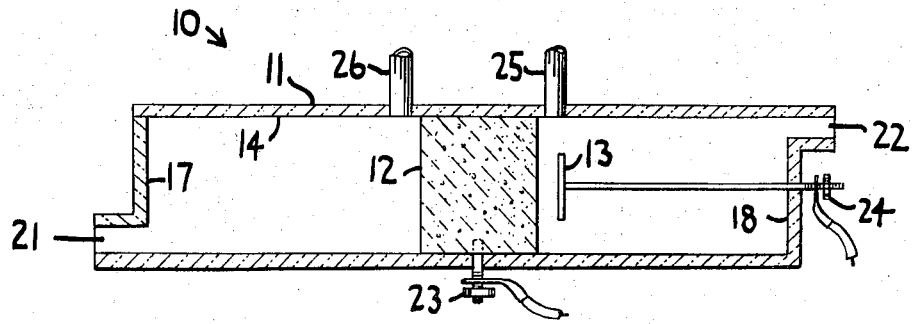
FIG. 2 shows a cross-sectional view of one type of a cell that may be used to carry out the present invention.

The cell 10, which may be used for carrying out the present invention, is shown in FIG. 2 and comprises a cell container or body 11, a porous cathode 12, and an anode 13. The cell of the present invention may be of any desired size and shape. The cell 10 may have a cell body 11 which is cylindrically shaped. The cell body 11 may be comprised of any suitable material so long as the portions thereof in contact with the brine solution, that is, principally the inner surfaces, are resistant to the corrosive action of the brine. For example, glass may be employed or alternatively, steel which is lined with rubber or plastic. The cell body 11 includes a cylindrical side wall 14 and a pair of end walls 17 and 18 each including an opening 21 and 22, respectively, for admitting or removing brine. The cell body 11 has a pair of vents 25 and 26 for removal of gases from the cell.

The cathode 12 is comprised of a porous electrode material and is sealed within the cell body 11 such that the brine cannot escape therearound but rather must pass through the porous cathode 12. Although the cathode may be comprised of various porous material having various degrees of porosity, preferably it is comprised of an electrically-conductive carbonaceous material, for example, graphite or carbon. Other materials, such as sintered metal, may be used in place of the carbonaceous material providing such materials can withstand the conditions in the cell without decomposing and providing such materials have pores or channels of very small diameter, for example, in the range of 0.0005 to 0.06 inch and, preferably, between 0.0010 and 0.0050 inch. The cathode should be made of a material that is resistant to conditions and materials in the cell such as cathodic conditions and the presence of chlorine, mercury, brine, etc., during normal operations as well as withstanding the conditions when the cell is out of operation. Furthermore, the cathode preferably should be capable of withstanding the anodic conditions that occur during the preferred regeneration technique. The necessary thickness of the cathode may vary depending upon such things as cathode material, cathode porosity, and the brine flow rate. However, the thickness will generally be between 0.25 and 5 inches. The cathode thickness could be as small as $\frac{1}{16}$ inch providing the cathode is constructed of material that will provide the necessary strength and rigidity at that thickness.

The anode 13 may be comprised of any electrically-conductive, anodically-resistant material. The anode preferably has a low overvoltage and is resistant to corrosion and/or decomposition if the electrical current is discontinued or the polarity is reversed. The anode is, preferably, a non-porous, anodically-resistant, electrically-conductive carbonaceous material such as carbon or graphite. The anode, however, may alternatively be comprised of a platinum group metal or titanium coated with a platinum group metal. As used herein, the term platinum group metal includes all of the metals of the platinum group; namely, ruthenium, rhodium, palladium, osmium, iridium, and platinum. Furthermore, the oxides of the platinum metals or mixtures of two or more such oxides could be used as the coating on the titanium metal.

Cathode 12 includes an electrical contact 23, and the anode 13 includes an electrical contact 24 whereby the cell 10 may be connected to a source of electrical potential (not shown). The electrical potential of the cell should be preferably in the range of about 1.6 to 5 volts—rarely, if ever, more than 6 volts—but, in any event, the current density should be below that at which the brine itself will rapidly decompose, forming substantial amounts of hydrogen and chlorine, particularly when the cell is connected in the hereinafter-described anode upstream arrangement. Moreover, the cell should not materially reduce the sodium chloride content of the brine.

The brine flow through cell 10 may be with the anode upstream of the cathode or, alternatively, with the anode downstream of the cathode. When cell 10 is connected with the anode upstream of the cathode, the brine enters the cell through opening 22, passes through the anode 13 and then the porous cathode 12. The brine leaves the cell through opening 21.

Cell 10 can be connected with the anode 13 downstream of the cathode by passing the brine into the cell 10 through opening 21. The brine passes through the porous cathode 12 and from thence into contact with anode 13 and out of the cell through opening 22.

Figure 3:
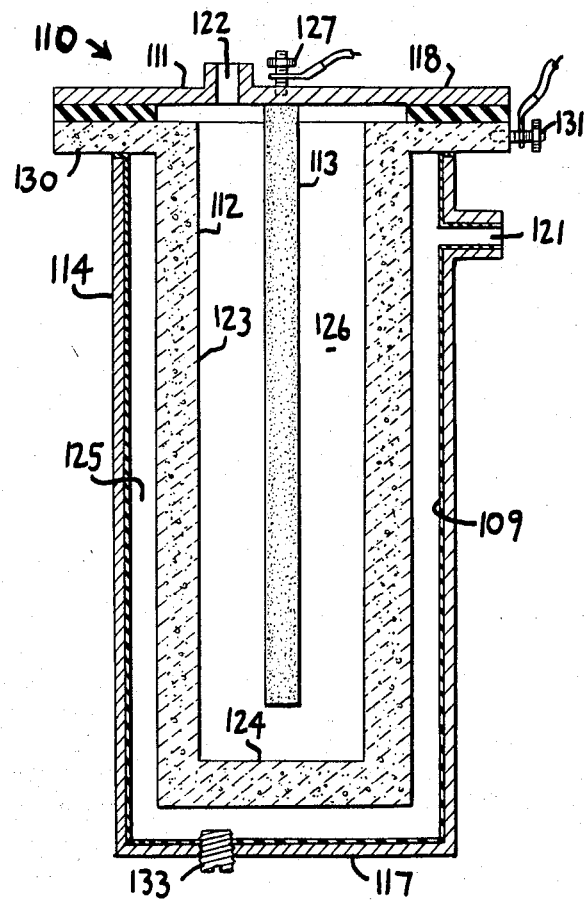
FIG. 3 shows a cross-sectional view of another type of a cell used in the invention.

The cell 110, illustrated in FIG. 3, is another cell structure that can be used in carrying out the present invention. The cell 110 is comprised of a cell container 111, a porous cathode 112, and an anode 113. The cell container 111 may be of any brine-resistant material such as steel having a rubber lining 109 and includes a cylindrical side wall 114, an end wall 117, and a cover 118. The side wall 114 has an opening 121 for admitting brine to the cell 110 and the cover 118 has an opening 122 for removing brine from the cell 110.

The cathode 112 may be of any suitable porous electrode material such as those described with respect to the cathode 12 of cell 10. The cathode 112, in the present embodiment, comprises a tube including a side wall 123 and an end wall 124. A radially-extending impervious flange 130 is provided at the upper end of cathode 112 for supporting the cathode 112 in the cell body 111. A screw 131 is mounted in flange 130 for connecting the cathode to an electrical source. The cathode 112 is suitably insulated from cover 118 and container 111. The dimensions of the cathode 112 may be selected in accordance with the rate at which brine must be treated. Furthermore, a plurality of cells connected in parallel could be used if large amounts of brine are to be treated. Also, two or more cells could be connected in series which, particularly in certain situations, may more effectively remove the impurities. The walls 123 and 124 of cathode 112 should be spaced sufficiently from the cell container 111 so as to permit a free flow of brine in the space 125.

The anode 113 may be of any brine-resistant material having the necessary electroconductive properties, typically, impervious graphite may be employed. The anode 113 may be attached to the cover 118 such as by screw 127 and, if desired, may be suitably insulated from the cover 118. The screw 127 is further used for connecting anode 113 to an electrical source (not shown). The anode 113 is disposed concentrically within the tubular cathode 112 and, preferably, should be sufficiently spaced at all points from the cathode 112 to permit unobstructed flow of brine in space 126. A threaded plug 133 is provided in the bottom of the cell for drainage purposes.

Although the present invention is described in terms of purifying brine containing contaminants of the nature which are picked up from a mercury cell, it is applicable to the purification of brine regardless of contaminant source. The brine will generally be an aqueous solution of sodium chloride. However, the present invention would also include treatment of brines or aqueous solutions of other alkali metal halides such as potassium chloride, lithium chloride, rubidium chloride, and cesium chloride. In its broader aspects, the present invention would include the removal of mercury, which is present as an ion, from the aqueous brine solution of any metal chloride which is sufficiently electropositive that hydrogen gas, rather than the metal, is liberated at the cathode.

Brines containing between 110 and 350 grams of sodium chloride per liter of solution are treated effectively. However, brine containing greater or lesser amounts of sodium chloride may be purified using the present invention. The brine will, in actuality, rarely contain less than 50 grams of NaCl per liter. The brine, for practical reasons, preferably should be acidic, having a pH of between 1 and 5, although brine that is alkaline may also be purified by the present invention. If the brine contains substantial amounts of free, that is, dissolved, chlorine, the amount of chlorine present preferably should be reduced before treatment in the cell. Desirably, the brine should contain less than 0.003 gram free chlorine per liter. The brine may contain as high as 0.01 gram free chloride per liter; but rarely should the brine contain 0.1 gram free chlorine per liter. The chlorine may be removed by passing the brine through a conventional dechlorination tower where a stream of air, which is blow through the brine, carries away the dissolved chlorine gas.

The present invention is directed primarily to the removal of metallic impurities which are present in brine, particularly in the form of complex anions such as $HgCl_4^=$. Such anions, being negatively charged, tend to avoid the cathodic zone of conventional cells. The present invention overcomes this priblem by passing the brine through a cathode having very fine openings or pores. The negatively-charged anions are thus passed in close proximity to the negatively-charged cathode, thereby facilitating electrolytic deposition of the metal on the cathode.

The operation of cell 10 and cell 110 is substantially identical. For example, using the anode downstream arrangement the brine enters the cell and passed through the porous cathode. The metallic impurities, e.g., mercury, are deposited on the cathode. Close examination of the cathode following operation indicated that the deposited mercury was located principally within the cathode rather than on either of the exterior faces of the cathode. However, it is possible that the mercury was deposited on the upstream face of the cathode and hydraulically moved into the cathode. Other metallic impurities such as iron are deposited nearer the anode, for example, a substantial amount was observed on the exterior face of the cathode adjacent the anode. For example, a porous cathode from a cell that had been operated in a downstream arrangement for 230 hours was examined by dividing the cathode into five equal segments The first segment (e.g., the segment closest to the anode) contained 9.1% of the total mercury and 58.7% of the total iron deposited. The third or middle segment contained 41.8% of the total mercury and only 4.0% of the total iron.

The brine next contacts the anode where free chlorine is formed. Free chlorine has been found to inhibit the deposition of mercury and, in some cases, even strip mercury deposits from the cathode. It is for this reason that substantially all of the free chlorine should be removed from the brine prior to treatment in the cell. The anode downstream arrangement can achieve exceptionally low levels of mercury in the product brine due to the fact that the mercury is deposited within the cathode and the free chlorine is subsequently formed at the anode, thus the free chlorine is prevented from interfering with the mercury deposit. For example, the free chlorine is swept away from the anode by hydraulic flow and thus back migration of the chlorine to the cathode is prevented.

The operation of the cell in the anode upstream arrangement is similar to the anode downstream arrangement except that the brine first comes in contact with the anode where the free chlorine is formed and then the brine passes through the porous cathode. It was discovered that if such free chlorine remained in the brine and was required to pass through the cathods, as would be the case when cell 110 is connected in the anode upstream arrangement, very poor mercury removal resulted. On the other hand, satisfactory mercury removal was obtained with cell 10 in the anode upsteam arrangement where a vent 25 was provided for removal of free chlorine prior to passage of the brine through the cathode. A similar vent 26 was provided for removal of hydrogen gas from the cell when in the upstream arrangement. If desired, means could be provided in cell 110 for removing the free chlorine formed at the anode so that the chlorine would not pass through the cathode.

The brine may be passed through the cell at any of various rates of flow. The preferred rate of flow for cell 10 was in the range of about 1 to 8 pounds of brine per minute per square foot of cathode face area and rarely should the flow rate exceed 10 pounds per minute per square foot of cathode face area. The face area of the cathode 12 is the area of the upstream side of the cathode.

Once the cell has been in operation for a substantial period of time, the cell may cease to remove the impurities to a satisfactory level. For example, elemental mercury deposited on the cathode may begin to break through into the product brine. Furthermore, the cell may cease to satisfactorily remove the metallic ions from the solution. When this happens, the cathode should be cleaned or regenerated. Also, the amount of metal deposited on or in the cathode may be sufficient to create an excessive back pressure and thus necessitate cleaning or regeneration. Any one of several methods of regeneration may be used. The simplest method is to reduce the electrical potential below the deposition potential of the particular impurities being removed and continue to pass dechlorinated brine through the cell, thereby causing the metallic impurities to go back into solution. Another method is to reverse the electrical potential and continue to pass dechlorinated brine through the cell. In this case the electrical potential may be maintained the same as is used during normal operation of the cell. The metallic deposits in the porous electrode (i.e., now the anode) will be released into the brine in large amounts.

A preferred method of regeneration which is highly effective for removing mercury from the cathode comprises passing brine containing substantial amounts of free chlorine, such as in the range of 0.05 to 0.1 gram chlorine per liter, but, preferably saturated with chlorine, through the cell. The effectiveness of this method of regeneration is further increased by reversing the electrical potential. Brine, taken directly from the mercury cell without passing through the dechlorination tower, has been found to contain as much as 0.25 gram of chlorine per liter and has been found highly satisfactory for this purpose. The brine temperature should preferably be between 40° F. and 180° F. and, more preferably, between 70° F. and 105° F., although other temperatures may be used. This method is highly effective for removing mercury from the porous electrode. However, it was found that this method did not completely remove the iron from the electrode, particularly if the cathode had substantial amounts of iron present.

The iron can be satisfactorily removed by following any of the above methods with an acid flush. The acid may be any inorganic acid; however, hydrochloric acid is preferable. The acid may be circulated through the cell under either normal or reversed potential. One highly satisfactory embodiment of the present invention used a reversed polarity and circulated brine saturated with chlorine through the cell followed by hydrochloric acid having a concentration of between 6 and 8 percent HCl. Hydrochloric acid has also been found satisfactory. The duration of the acid flush, of course, depends on the amount of iron that must be removed. Following normal operation of the cell, a one-hour flush produced satisfactory results.

The mercury released into the brine during regeneration can be recovered by adding the regeneration brine to the brine stream feeding a mercury cell. A substantial amount of the mercury in the regeneration brine will be plated out on the mercury cathode.

Table I shows typical types of porous carbon and graphite suitable for use as the cathode of cell 10 or 110.

The following table shows the effectiveness of the cell after operation for various elapsed time periods. The cell removed on the average more than 99 percent of the mercury.

TABLE II

Anode Downstream Arrangement (feed contained 5,870 µg./l. Hg)

| Hours of operation | 19 | 40 | 56 | 64 | 80 | 100 | 140 | 148 |
|---|---|---|---|---|---|---|---|---|
| Product (µg./l. Hg) | 2 | 6 | 6 | 8 | 5 | 5 | 6 | 6 |

Anode Upstream Arrangement (feed contained 4,900 µg./l. Hg)

| Hours of operation | 8 | 24 | 32 | 40 | 48 | 56 | 64 | 70 |
|---|---|---|---|---|---|---|---|---|
| Product (µg./l. Hg) | 59 | 54 | 48 | 20 | 8 | 39 | 28 | 29 |

TABLE I

| | Weight, pounds per cu. ft. | Strength, pounds per square inch | | | Percent porosity | Average pore diameter, inches | Minimum diameter particle retained, inches | Average permeability | |
|---|---|---|---|---|---|---|---|---|---|
| | | Tensile | Compressive | Flexural | | | | Air [1], cu. ft. per sq. ft. per min. | Water [2], gal. per sq. ft. per min. |
| Porous carbon: | | | | | | | | | |
| Type A | 64 | 100 | 800 | 300 | 48 | .0047 | .0025 | 10 | 90 |
| Type B | 65 | 200 | 900 | 500 | 48 | .0023 | .0009 | 3 | 30 |
| Type C | 66 | 300 | 1,000 | 600 | 48 | .0013 | .0005 | | 10 |
| Porous graphite: | | | | | | | | | |
| Type D | 64 | 70 | 400 | 200 | 48 | .0047 | .0025 | 10 | 90 |
| Type E | 65 | 150 | 500 | 300 | 48 | .0023 | .0009 | 3 | 30 |
| Type F | 66 | 200 | 600 | 400 | 48 | .0013 | .0005 | | 10 |

[1] Air at 70° F. with 15 percent relative humidity—2 inch water pressure—plate 1 inch thick. Air volume measured at 760 millimeters Hg pressure, 70° F.
[2] Water at 70° F.—5 pounds per square inch gauge—plate 1 inch thick.

The cell used in the following Examples I–VI was constructed substantially identically to the aforedescribed cell 10. The cell container was comprised of Pyrex pipe having an internal diameter of 2 inches and an overall length of approximately 11½ inches. The porous cathode, unless otherwise specified, had a diameter of 2 inches, a cathode face area of about 3.1416 square inches, a thickness of 1 7/16 inches, and was made of Type E porous graphite (see Table I). The anode, unless otherwise specified, consisted of a 10-inch length of 28 gauge platinum wire in the form of a spiral approximately 2 inches across. The plane of the spiral was 3/8 inch from the face of the cathode.

The cell in Examples I–VI, unless otherwise indicated, was operated under the following conditions:

Brine feed rate: 3.2 pounds per minute per square foot of cathode upstream face area Current density: 27.6 amperes per square foot of cathode upstream face area The brine treated in Examples I–IX was obtained from a brine stream leaving a mercury cathode cell. The brine was fortified with sodium chloride so as to contain between 305 and 318 grams of sodium chloride per liter of solution. The brine was acidified to a pH of between 1 and 2 and passed through a conventional dechlorination tower where free chlorine was reduced to less than 0.003 gram per liter of solution.

EXAMPLE I

The following illustrates the effectiveness of the present invention in removing mercury from brine. The cell temperature was 75° F. The cell was operated for 148 hours with the anode located downstream of the cathode. The cathode was regenerated by reversing the electrical potential, passing brine containing substantial amounts of free chlorine through the cell for four hours, and then passing 5 percent hydrochloric acid through the cell for one hour. The cell was then placed in normal operation for 70 hours using the anode upstream arrangement.

EXAMPLE II

The following shows the effect of chlorine on the removal of mercury. Cell 10, throughout this example, was operated with the anode downstream of the cathode. As shown in Table III, the cell 10 was operated for 20 hours using an impervious graphite anode of the type manufactured by Stackpole Carbon Company under the designation Grade HBI–17. The graphite anode was then replaced with a platinum anode for 2 hours. The feed brine contained less than 0.003 gram free chlorine and 4,050 µg. mercury per liter of solution. The product brine contained less than 100 µg. mercury per liter. The cell was further operated for 2 hours using feed brine that had a large amount of free chlorine. The product brine contained 180,000 µg. of mercury per liter.

The cathode was regenerated and the cell operated for 23 hours using feed brine that had a large amount of free chlorine. The product brine contained 700 µg. mercury per liter. The cell was further operated for 23 hours treating brine having low free chlorine content and the mercury content of the product brine was 240 µg./liter. The dissolved chlorine gas apparently inhibits the deposition of mercury and/or strips the mercury from the cathode.

TABLE III

| Run | Anode material | pH Feed | pH Product | G./l. Cl₂ in feed | Cell temperature, °F. | Cell voltage | Hours operated | Brine analyses, µg./l. Hg Feed | Brine analyses, µg./l. Hg Product |
|---|---|---|---|---|---|---|---|---|---|
| 1 | Graphite | 1.7 | 6.95 | 0.003 | 140–160 | 3.0 | 20 | 4,050 | 92 |
| 2 | Platinum | | | 0.003 | 140 | 3.5 | 2 | 4,050 | 80 |
| 3 | do | | | 0.1 | 130–140 | | 2 | 4,050 | 180,000 |
| 4 | Graphite | 1.7 | 3.85 | 0.1 | 160 | 2.6 | 23 | 5,145 | 700 |
| | do | 1.7 | 7.4 | 0.003 | 160 | 3.0 | 23 | 5,145 | 240 |

EXAMPLE III

The following illustrates the effect of current density, brine flow rate, and temperature on the level of mercury removal. The cell was operated with the anode downstream for about 400 hours. The current density was varied between 4.6 and 27.6 amperes per square foot of cathode face area. The brine flow rate was varied between 0.67 and 5.29 pounds of brine per square foot of cathode face area. The temperature of the brine was varied between about 100° F. and 170° F. The effect of varying the current density and the brine flow rate was not a statistically significant factor within the ranges stated. The temperature variation, however, was found to have a very material effect as shown in FIG. 3. Mercury removal was more effective at lower temperatures. For example, when the cell was operated at 100° F., the product brine contained a little over 60 μg. mercury per liter; whereas when the cell was operated at 160° F., the product brine contained about 290 μg. of mercury per liter.

The cell was operated for 24 hours with the anode upstream of the cathode. The cell temperature was maintained at 160° F. The feed brine contained 4,400 μg. mercury per liter and the product brine contained 44 μg. mercury per liter. The cell was further operated for 26 hours at 80° F. The feed brine contained 4,400 μg. mercury per liter and the product contained 36 μg. mercury per liter. The temperature was thus found to have very little effect, if any, on anode upstream operation of the cell.

Brine having low mercury levels can be produced using the cell with either the anode upstream or anode downstream arrangements. The anode downstream arrangement produces the best results but requires a reduced temperature; for example, 75° F., to obtain such results. The anode upstream arrangement, on the other hand, is apparently temperature independent at least within a range of about 80° F. to 160° F.

EXAMPLE IV

The cell of the present invention may be comprised of material other than graphite. For example, a cell was constructed substantially identical to the cell used in Example I except that the cathode was comprised of the afore-described Type C porous carbon. The cell was operated for 33 hours with the anode downstream of the cathode and at a temperature of about 160° F. The brine flow contained 6,500 μg. of mercury per liter of solution. The brine product contained on the average of 270 μg. mercury per liter of solution. Such results are comparable to the results obtained under similar conditions using a porous graphite cathode as described in Example III.

EXAMPLE V

The following shows that neutral and alkaline brine may be treated by the present invention. Brine was passed through the cell substantially as afore-described except that the pH was adjusted as shown in the following table. Substantially the same results were obtained regardless of whether the brine was acidic, basic, nor neutral.

TABLE IV

| Run | Length of run (hrs.) | Analyses | | | |
| --- | --- | --- | --- | --- | --- |
| | | Feed | | Product | |
| | | μg./l. Hg | pH | μg./l. Hg | pH |
| 1 | 63 | 5,575 | 10.7 | 24 | 10.7 |
| 2 | 44 | 5,480 | 7.0 | 22 | 8.0 |
| 3 | 46 | 5,480 | 3.0 | 24 | 7.6 |

The cell used in Examples VI–IX is a preferred embodiment of the present invention and was constructed substantially identical to the afore-described cell 110. The cell included a cathode having an outside diameter of 6⅝ inches and an overall length of 36 inches. The wall thickness was 1 7/16 inches and the inside diameter was 3¾ inches. The outer face area was 5.1 square feet and the inner face area was 2.9 square feet. The cathode was comprised of the above-described Type E porous graphite. The anode was comprised of impervious graphite rod having a diameter of 1 5/16 inches and a length of 33½ inches. The impervious graphite anode was of the type manufactured by Stackpole Carbon Company under the designation Grade HB1–17. The cell body was a rubber-lined steel tube having an inside diameter of 8 inches.

EXAMPLE VI

The above-described cell 110 which is one preferred cell for carrying out the present invention, was operated for 124 hours. The brine feed rate to the cell was 1 gallon per minute. The anode was positioned downstream of the cathode. The cell was operated at about 4 volts and the temperature was maintained below 80° F. The brine contained on the average of about 3,400 μg. mercury per liter of solution. The following shows the effectiveness of the cell after being in operation for various elapsed time periods.

TABLE V

| Hours of operation | 12 | 28 | 44 | 60 | 76 | 92 | 108 | 124 |
| --- | --- | --- | --- | --- | --- | --- | --- | --- |
| Product (μg./l. Hg) | 21 | 14 | 8 | 3 | 9 | 23 | 18 | 24 |

EXAMPLE VII

Figure 4:
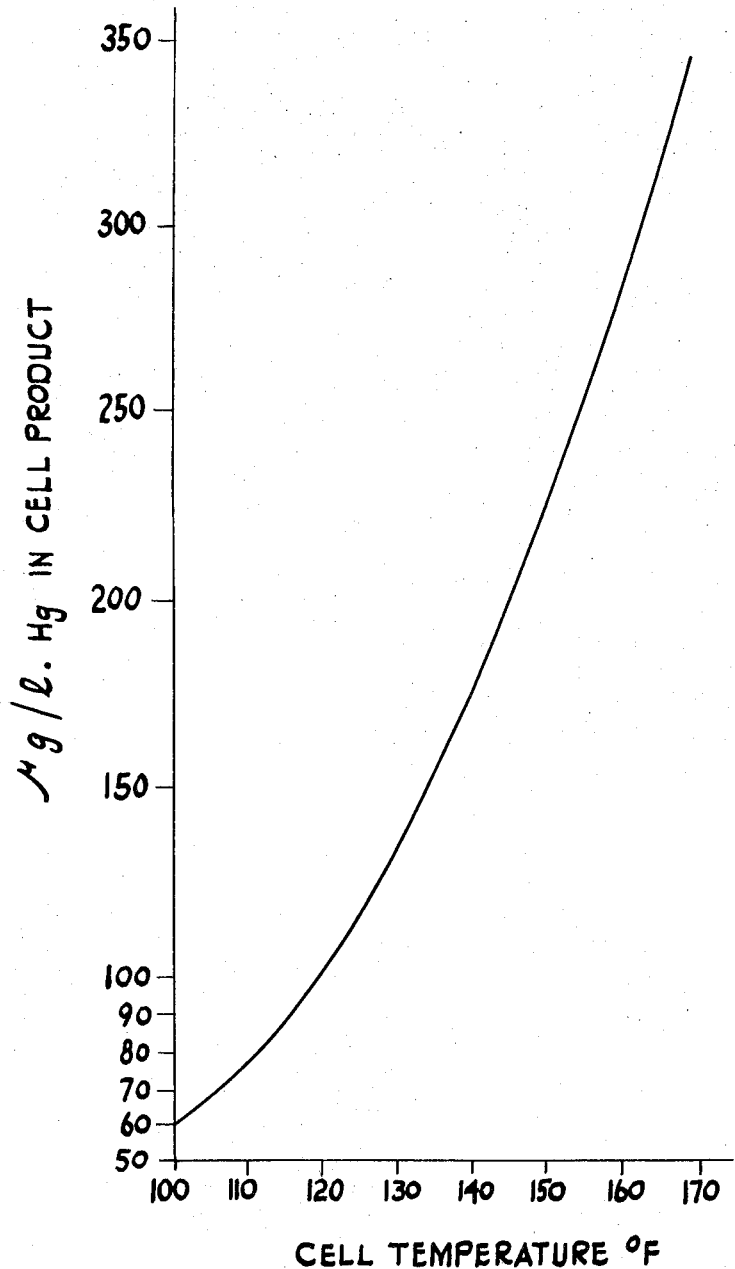
FIG. 4 is a graph showing the effect of temperature when the cell is connected with the anode downstream of the cathode.

FIG. 4 shows the effect of various brine flow rates on the level of mercury removal by the tubular cell. The cell was operated with the anode downstream and at about 80° F. The flow rates used were 1, 2, and 3 gallons per minute. The brine had a density of about 10 pounds per gallon. In order to produce brine containing consistently less than 30 μg. mercury per liter of solution, it was necessary to terminate the operation after 24 hours when using a flow of rate of 3 gallons per minute whereas consistently low results were achieved for 5 days when using a flow rate of 1 gallon per minute.

EXAMPLE VIII

To determine the effectiveness of cell 110 on removal of iron from brine, the cell was operated for 96 hours under conditions as described in Example VI. The flow rate was 1 gallon per minute. The following results indicate that the present invention removes a substantial amount of iron from brine.

TABLE VI

| Elapsed hours of operation | 16 | 32 | 64 | 96 |
| --- | --- | --- | --- | --- |
| Feed (μg./l. Fe) | .00038 | .00027 | .00037 | .00034 |
| Product (μg./l. Fe) | .00002 | .00006 | .00002 | .00002 |

Since the presence of substantial amounts of iron in the brine is detrimental to mercury removal, it may be desirable in certain cases to connect two or more cells in series. The first cell would remove a substantial amount of the iron and the subsequent cell would more effectively remove the mercury.

EXAMPLE IX

The following illustrates procedures for regenerating a cell after an operational period.

The cell was operated until substantial amounts of mercury began to break through into the product brine. The cell potential of 4 volts was reversed and brine containing less than 0.003 gram per liter chlorine was passed through the cell at a flow rate of 0.9 gallon per minute. The brine was at 95° F. and was passed through the cell for 4 hours. The cell was again placed in normal operation where it functioned satisfactorily. The feed brine contained an average of about 3,500 μg. mercury per liter and the product brine contained an average of 79 μg. mercury per liter. After 18 hours, the mercury began to again break through into the product brine.

The cell was again regenerated following mercury breakthrough. This time the regeneration comprised reversing the potential and circulating brine, saturated with free chlorine, through the cell at a flow rate of 0.9 gallon per minute. This brine was taken directly from a mercury cell without dechlorination; however, the brine had been resaturated with sodium chloride. The brine temperature was 95° F. The brine was passed through the cell for 2½ hours. Examination of the porous cathode following regeneration indicated satisfactory removal of mercury but incomplete removal of iron. The cell was placed in normal operation where it satisfactorily removed mercury from brine. The cell was operated for 70 hours and operation was terminated although mercury had not begun to break through. The product brine contained an average of 37 μg. mercury per liter.

A cell, following mercury breakthrough, was regenerated by current reversal and passing brine, saturated with chlorine through the cell for 4 hours. The brine was at 78° F. An acid solution containing between 6% and 8% HCl was passed through the cell for 1 hour. Examination of the cathode indicated satisfactory removal of both mercury and iron. The cell was subsequently operated satisfactorily for 225 hours. The product brine contained an average mercury content of 19 μg. per liter.

Although the invention has been described with reference to certain specific details of preferred embodiments, it is not intended to thereby limit the scope of the invention except insofar as these details are included in the accompanying claims.

I claim:

1. A method of purifying a brine stream having metal ion impurities therein which comprises:
   flowing the brine stream through a porous cathode;
   applying an electromotive potential between the porous cathode and an anode; and
   maintaining a low free halogen content within the cathode.

2. The method as defined in claim 1 wherein the cathode is comprised of a porous material selected from the group consisting of graphite and carbon.

3. The method as defined in claim 1 wherein the porous cathode includes pores having a diameter of between 0.0005 and 0.06 inch.

4. The method as defined in claim 1 wherein the cathode is comprised of porous graphite having a porosity of about 48 percent, an average pore diameter of about 0.0023 inch, and a water-permeability of about 30 gallons per square foot per minute under pressure of 5 pounds per square inch gauge.

5. The method as defined in claim 1 wherein the brine is an aqueous solution of an alkali metal chloride and further including the step of stripping free chlorine from said brine prior to passing said solution through the electrolytic cell.

6. The method as defined in claim 1 wherein the anode is placed downstream of the cathode.

7. The method as defined in claim 6 wherein the temperature is in the range of 60° F. to 100° F.

8. The method as defined in claim 1 wherein the anode is placed upstream of the cathode and wherein the free halogen formed at the anode is removed from the brine before the brine passes through the cathode.

9. The method of claim 1 wherein the brine impurities include mercury and at least one member selected from the group consisting of copper, iron, nickel, lead, vanadium, and manganese.

10. The method of claim 9 wherein the brine is passed through a first electrolytic cell which removes substantially all of the impurities selected from the group consisting of copper, iron, nickel, lead, vanadium, and manganese and is then passed through a second electrolytic cell to remove mercury.

11. The method as defined in claim 9 wherein the impurity is in the form of a complex ion.

12. The method as defined in claim 1 including regenerating the cathode by reducing the electrical potential on the cell below that at which the impurities are deposited on the cathode and passing brine through the cell.

13. The method as defined in claim 1 including regenerating the cathode by reversing the electrical potential on the cell and passing brine through the cell.

14. The method as defined in claim 13 wherein said regenerating brine contains more than 0.1 gram per liter of free chlorine.

15. The method as defined in claim 1 including the step of regenerating the cathode by passing brine containing more than 0.1 gram per liter of free chlorine through the cell.

16. The method as defined in claim 14 further including passing hydrochloric acid through the cell during at least a portion of said regenerating step.

17. The method of claim 1 wherein the free halogen is chlorine.

18. The method of claim 17 wherein the free chlorine content is less than 0.1 gram per liter.

19. The method of claim 1 wherein the metal ion impurity is mercury.

20. The method of claim 19 wherein the concentration of the mercury in the brine to be purified is less than 15,000 micrograms per liter.

21. A method of regenerating a porous cathode of an electrolytic cell which has been used for removing mercury impurities from an aqueous solution comprising:
   reversing the electrical potential of said cell, thereby making said cathode anodic;
   passing brine containing free chlorine through said cell while applying the electrical potential; and
   subsequently passing said brine through a mercury cathode cell, thereby recovering said mercury.

22. A method of removing mercury from an aqueous medium containing up to 15,000 micrograms of mercury therein per liter of medium which comprises passing the medium through a liquid-permeable cathode while imposing an electromotive force between the cathode and an anode whereby to deposit mercury within the cathode, maintaining the medium substantially free of elemental halogen, and removing the medium thus reduced in mercury content from the cathode.

23. The process of claim 22 wherein the medium is passed through such cathode until the mercury content is reduced below 50 micrograms per liter of medium.

24. The process of claim 22 wherein the medium is passed through such cathode until the mercury content is reduced below 20 micrograms per liter of medium.

25. The process of claim 22 wherein the concentration of elemental halogen in the liquid medium is less than 0.1 gram per liter.

26. The process of claim 22 wherein the concentration of elemental halogen in the liquid medium is less than 0.003 gram per liter.

27. The process of claim 22 wherein the mercury is recovered from the liquid-permeable cathode.

28. A method of regenerating a porous cathode of an electrolytic cell which has been used for removing metal ion impurities from an aqueous solution including the steps of reversing the electrical potential of said cell, thereby making said cathode anodic and passing brine containing free chlorine through said cell while applying the electrical potential.

29. The method as defined in claim 28 including the further step of passing an inorganic acid through the cell during reversal of electrical potential thereby removing iron from said porous cathode.

References Cited

UNITED STATES PATENTS

| | | | |
|---|---|---|---|
| 2,573,967 | 11/1951 | Hamlin | 204—186 |
| 2,982,608 | 5/1961 | Clement | 204—130 |
| 3,061,537 | 10/1962 | Yagishita | 204—130 |
| 3,244,605 | 4/1966 | Hotchkiss | 204—153 |
| 3,250,692 | 5/1966 | Hass, et al. | 204—130 |
| 3,324,026 | 6/1967 | Waterman, et al. | 204—302 |
| 3,457,152 | 7/1969 | Maloney, Jr. et al. | |

FOREIGN PATENTS

| | | |
|---|---|---|
| 595,813 | 4/1960 | Canada. |
| 357,630 | 9/1931 | Great Britain. |

JOHN H. MACK, Primary Examiner

T. TUFARIELLO, Assistant Examiner

U.S. Cl. X.R.

204—99, 220, 284